(12) United States Patent
Eichen (10) Patent No.: US 6,237,002 B1
(45) Date of Patent: May 22, 2001

(54) METHOD FOR PROCESSING COMPUTERIZED DATE DATA WHICH SPANS CENTURIES

(75) Inventor: Gerald K. Eichen, Columbus, IN (US)

(73) Assignee: Cummins Engine Company, Inc., Columbus, IN (US)

(*) Notice: Subject to any disclaimer, the term of this patent is extended or adjusted under 35 U.S.C. 154(b) by 0 days.

(21) Appl. No.: 08/992,806

(22) Filed: Dec. 18, 1997

(51) Int. Cl.⁷ .................................................. G06F 17/30
(52) U.S. Cl. .................................................. 707/101; 707/4
(58) Field of Search ............................. 707/4, 100, 101, 707/102, 6

(56) References Cited

U.S. PATENT DOCUMENTS

| 5,600,836 | | 2/1997 | Alter | 707/101 |
|---|---|---|---|---|
| 5,630,118 | | 5/1997 | Shaughnessy | 707/1 |
| 5,644,762 | | 7/1997 | Soeder | 707/6 |
| 5,668,989 | * | 9/1997 | Mao | 707/102 |
| 5,719,826 | * | 2/1998 | Lips | 368/29 |
| 5,758,336 | * | 5/1998 | Brady | 707/6 |
| 5,761,668 | * | 6/1998 | Adamchick | 707/101 |
| 5,806,063 | * | 9/1998 | Dickens | 707/6 |
| 5,806,067 | * | 9/1998 | Connor | 707/100 |
| 5,809,500 | * | 9/1998 | Nolan | 707/6 |
| 5,812,849 | * | 9/1998 | Nykiel et al. | 395/701 |
| 5,813,012 | * | 9/1998 | Chase et al. | 707/102 |
| 5,828,890 | * | 10/1998 | Rehbock et al. | 395/733 |
| 5,878,422 | * | 3/1999 | Roth et al. | 707/100 |
| 5,903,895 | * | 5/1999 | Hoffman et al. | 707/101 |
| 5,926,814 | * | 7/1999 | Fridman | 707/6 |
| 5,930,506 | * | 7/1999 | Bieler | 395/704 |

* cited by examiner

Primary Examiner—Jean R. Homere
(74) Attorney, Agent, or Firm—Woodard, Emhardt, Naughton, Moriarty & McNett (57) ABSTRACT

There is provided a method for encoding and decoding date-oriented information associated with dates spanning the end of a century. The method of the present invention may be used with currently-known databases and other storage means for electronic information, which commonly store the date values representing dates associated with date-oriented information with a two-digit year designation. A preferred embodiment of the present invention includes dynamic windowing techniques. The encoding aspect of the method may be accomplished by altering the sequence of the digits in date values representing dates in the later century. The decoding aspect of the invention may be accomplished by placing the digits of the date value back in their pre-encoding sequence. Embodiments of the method providing for ordering date-oriented data in chronological order, either ascending or descending, are disclosed.

12 Claims, 7 Drawing Sheets

METHOD FOR PROCESSING COMPUTERIZED DATE DATA WHICH SPANS CENTURIES

FIELD OF THE INVENTION

This invention concerns the field of data processing using computers. More specifically, this invention relates to solutions to problems resulting from the use of two digits to signify the year in stored dates in databases and computer systems.

BACKGROUND OF THE INVENTION

A common requirement of computer systems is the processing of date-oriented information in chronological order. Because of the high cost of memory in computing systems and also because of the convenience, date-oriented information has commonly been stored in a format in which the year portion of the date associated with the information is represented by two digits. Thus, the year 1996 is commonly represented in computer applications as "96." Sorting and sequencing such information has not presented any problem up to now because such two-digit year designators (along with other designators representing days, weeks, and/or months) could easily be placed in their proper order. Current computer and software systems can easily compare, for example, 94 and 96, as representing 1994 and 1996 dates, and can accordingly arrange information associated with the dates and/or the dates themselves in proper chronological order.

However, present computer systems which process two-digit year data will not be able to adequately process date-oriented information associated with dates in the year 2000 and beyond. Dates during the year 2000 have a two-digit year designation of 00; without any additional information, a computer will organize date data having a year designation 00 as though the year was 1900. The result is that application programs relying on dates in their correct chronological order will be unable to operate properly with two-digit year date designations representing dates from both the $20^{th}$ and $21^{st}$ centuries.

Operations with date values are commonly performed by means of "windowing." Windowing is a technique in which only a portion of the total data is visible at any one time. Windows may be either fixed or sliding, with a fixed window having a definite starting and ending year, while a sliding or dynamic window provides for a user-defined starting and ending point. The common method of operating with two-digit year designations uses a fixed window of 100 years beginning with the digits 00 (representing 1900) and ending with 99 (representing 1999), the century designator (i.e. "19") being implied.

Various solutions have been suggested to address the impending problems associated with two-digit year designations spanning multiple centuries. One principal solution involves data expansion, which is the conversion of all two-digit year designations to four-digit year designations. In this way, sequencing and sorting of date data can occur as it always has. However, this solution has numerous disadvantages, foremost among which is the expense of conversion in terms of additional memory requirements and associated costs. Another problem is that data expansion is not easily retrofitted to existing systems due to incompatibility with existing data and software. Yet another problem with this solution includes significant amounts of system downtime during the conversion.

Another proposed solution is to make changes in the data accessing procedures. Use of two-digit year designators is retained, along with the concomitant out-of-sequence condition of the associated information. Instead, the logic of application programs which operate on the data is modified to retrieve data records using multiple passes. A first pass may, for example retrieve date-oriented information associated with $20^{th}$ century dates, and a second pass may retrieve $21^{st}$ century information. The principal disadvantages inherent in this proposed solution is that it changes the processing logic in application programs and that it is quite awkward to implement.

Yet another proposed solution is to modify application programs so that the programs change the year designation of a datum read from a master file or data storage. One example is U.S. Pat. No. 5.600,836 to Alter, which describes a system and method by which a virtual boundary is erected between a database or other data storage or input means containing date-oriented information and the application program using such information. The boundary is a date conversion which applies to any information crossing the boundary, i.e. being called from storage to an application program, or being output or stored from the result of the application program. Raw data are altered at the boundary by adding or subtracting a given value from the raw data and then performing operations on the altered data. This proposed solution has the drawback that it can only be used with a limited window of years.

IBM Corporation has developed versions of its Information Management System (IMS) database and processing software which is able to process some dates in 2000 and beyond. The IBM solution, like that of the Alter patent, is to add a sum to two-digit year designators representing dates in the years 2000–2059 inclusive. This is accomplished by adding 10 in hexadecimal format to the tens digit of a two-digit year designator having a tens digit of 0–5 inclusive. For example, the year 2010 would be represented by the two-digit year designator 10. The IBM method would add a hexadecimal equivalent of 10 to the tens digit, making the two-digit year designator B0 (where B is the hexadecimal digit equivalent to the value 11 in base-10 format). One disadvantage to the IBM solution is that it only works for a certain window of dates, in the above example dates between 1960 and 2059 inclusive.

Accordingly, there still exists a need for a method for easily and cost-effectively retaining the use of two-digit years for date-oriented information associated with dates in more than one century while maintaining the information in correct chronological sequence.

SUMMARY OF THE INVENTION

The present invention is a data encoding and decoding method which meets the foregoing need. Specifically, it comprises the encoding of date values associated with date-oriented information prior to processing such information and decoding the date values after processing is complete. The encoding of date values comprises changing the sequence of the hexadecimal characters representing the date portions of date-oriented information. Subroutines called prior to and after input and output operations carry out the method of the present invention.

In a specific embodiment of the present invention, date values representing dates prior to 2000 are not encoded, and therefore date values representing dates in the $20^{th}$ century do not require conversion. Date values representing dates in 2000 and beyond are encoded by changing the order of the hexadecimal characters representing them. After encoding, the date values may be sorted and sequenced or otherwise operated on by a desired application program. Following the operation of the application program, the data representing dates in 2000 and beyond are decoded for storage or output. In this way, existing dates within database structures and other forms of data storage do not need to be modified. Information Management System (IMS) database definitions are not changed, original program calls remain intact, and phased implementation of application programs is allowed.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated method and such fisher applications of the principles of the invention as illustrated therein being contemplated as would normally occur to one skilled in the art to which the invention relates.

The present invention comprises a method for processing information which contains dates spanning the end of a century. As used herein, the following terms are defined to have the following meanings.

"Century" preceded by an ordinal number is a 100-year period beginning on January 1 of a year ending in 00 and ending on December 31 of the next following year ending in 99. The "$20^{th}$ century" is therefore defined to be the years 1900–1999, and the "$21^{st}$ century" is defined to be the years 2000–2099. "Spanning the end of a century" or "spanning two centuries" describes a range of years beginning in one century and ending in the next following century. Thus, the period from 1960–2059 spans the end of a century. Any period of one or more years or centuries is deemed to begin on January 1 unless otherwise defined.

"Date values" are numerical designations of a specific date. Date values are commonly stored in many styles, identified using one or more lower case letters "y" (standing for "year"), "m" (standing for "month"), "w" (standing for "week"), and "d" (standing for "day"). Common styles include yyddd, yymmdd, and others. Thus, the date Jan. 1, 1997 is expressed as a date value in each of the two above-mentioned styles as 97001 and 970101, respectively. "Date-oriented data" is any information which includes or is associated with a date value. One possible example of date-oriented data is a financial debit or credit applied on a given date. A "year designator" is the two-digit yy portion of a date value.

Date values of any style are commonly stored in databases or other storage media or devices in one of two formats. The "packed decimal" format contains two hexadecimal digits per byte (each digit being identified by four bits of the byte) with the exception of the right-most byte, which contains a digit and a sign value. Dates in this format always have an odd number of digits and the associated sign value. The usual sign value is the hexadecimal value F, which corresponds to the value 15 in base-10 designation. For example, the date value of Feb. 28, 1997 in yyddd format and stored as a packed decimal is 97059F. The date value would be stored in three bytes, with 97 occupying the first byte, 05 occupying the second byte, and 9F occupying the third byte. Date values in yymmdd style require an addditional digit, commonly zero, as the first digit. Thus, Feb. 28, 1997, stored in yymmdd packed decimal form, is 0970228F, in a total of four bytes.

A second format for storing date values is "zoned decimal" format. Zoned decimal date values are formatted in a combination of one zone character and one digit character per byte, with the standard zone character being F and the digits having a value from 0–9. Thus, Feb. 28, 1997, in yyddd format stored as a zoned decimal, is F9F7F0F5F9, stored in five bytes. The same date in yymmdd format would occupy six bytes in zoned decimal form as F9F7F0F2F2F8.

"Windowing," is a data processing technique in which only a portion of the total available data is visible at any given time. Windowing may occur using either a fixed or a dynamic window. A fixed window provides for a constant starting and ending point for viewing data. Typical fixed windows in computer systems involving date-oriented information use two-digit designators for the year portion of a date value and provide a fixed window of 100 years, beginning at 1900 (represented by the two-digit year designator 00) and ending in 1999 (represented by the two-digit year designator 99). Alternate beginning and ending times may be added to a fixed windowing scheme by adding additional programming logic. Dynamic windowing, on the other hand, provides for a user-defined starting and ending point. A human user may set the window, or it may be set by a technique in which the window range is calculated internally by the application program and allows a forward and backward adjustment of the date from a variable point. The variable point may be the current system date.

Figure 1:
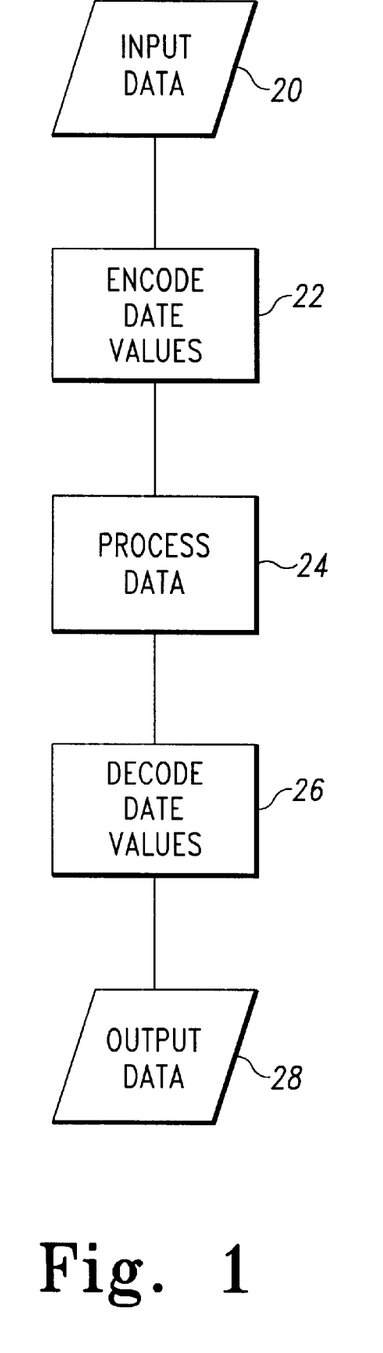
FIG. 1 is a flowchart illustrating one preferred embodiment of a method for providing date-oriented information in ascending chronological order according to the present invention.

As depicted in FIG. 1, one preferred method for carrying out some of the concepts of the present invention comprises acting on date-oriented information retrieved from a database or other storage medium prior to and/or after operation (s) thereon. The dates associated with the information have date values with two-digit year designators and span the end of a century. The method illustrated in FIG. 1 is accomplished by software subroutines which, in a preferred embodiment, carry out encoding and decoding steps on the date values representing dates in the later of the two centuries. The subroutine uses dynamic windowing to carry out the method.

Referring to FIG. 1, a set of date-oriented information is first obtained as indicated in step 20. Thereafter the subroutine operates on the date values associated with the date-oriented information and encodes the appropriate date values, as indicated in step 22. In step 24, the encoded date values are provided to an application program or other process, which processes the data in a desired fashion. When such processing is complete, a subroutine is called to decode the encoded date values, returning them to their original form, as depicted in functional block 26. After decoding, the processed information is output to storage or in another desired form indicating the result of the processing of the information, as depicted in functional block 28.

Figure 2A:
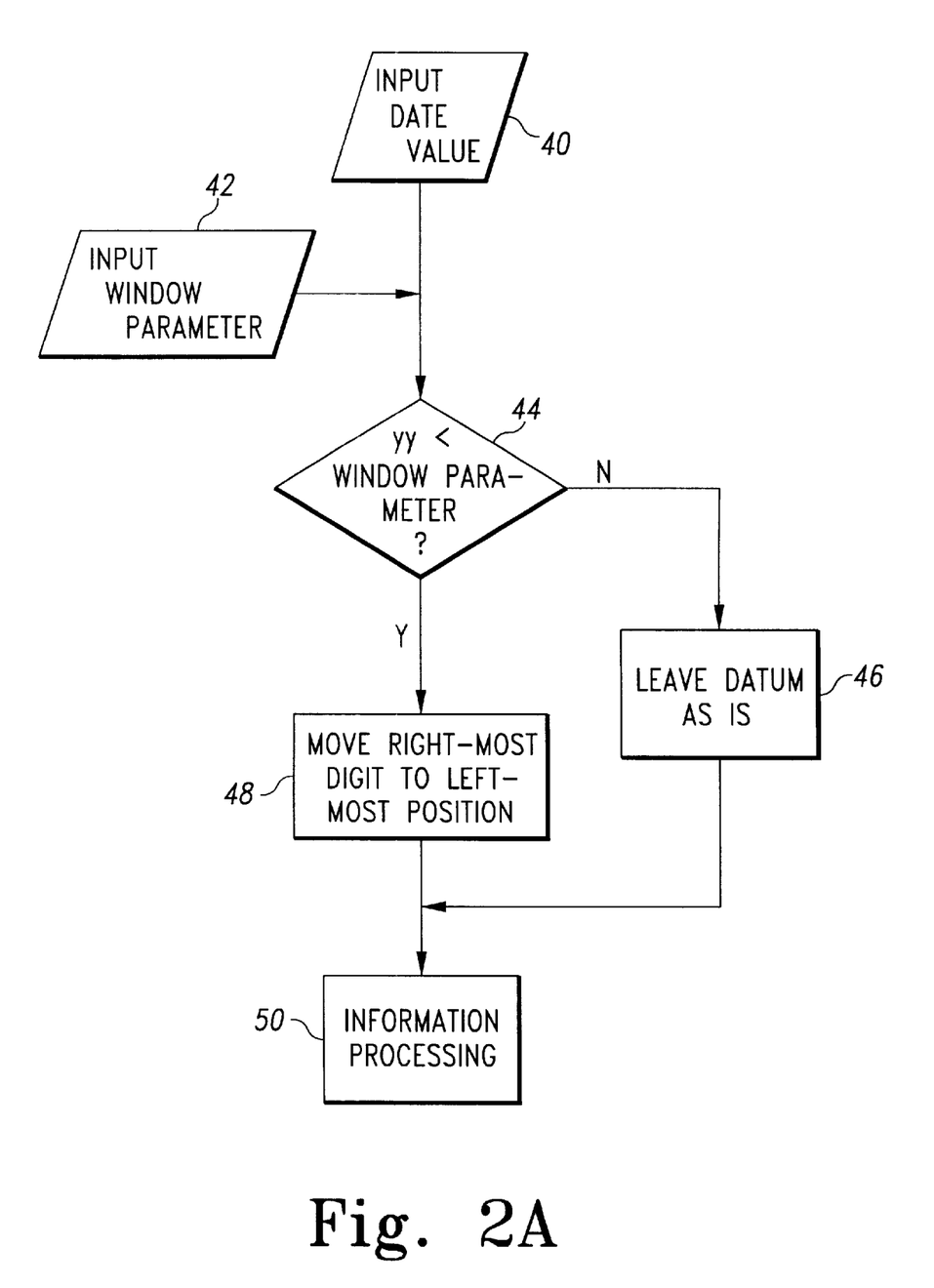
FIG. 2A is a flowchart illustrating one preferred embodiment of the encoding process for packed decimal date values used in the method depicted in FIG. 1.
Figure 2B:
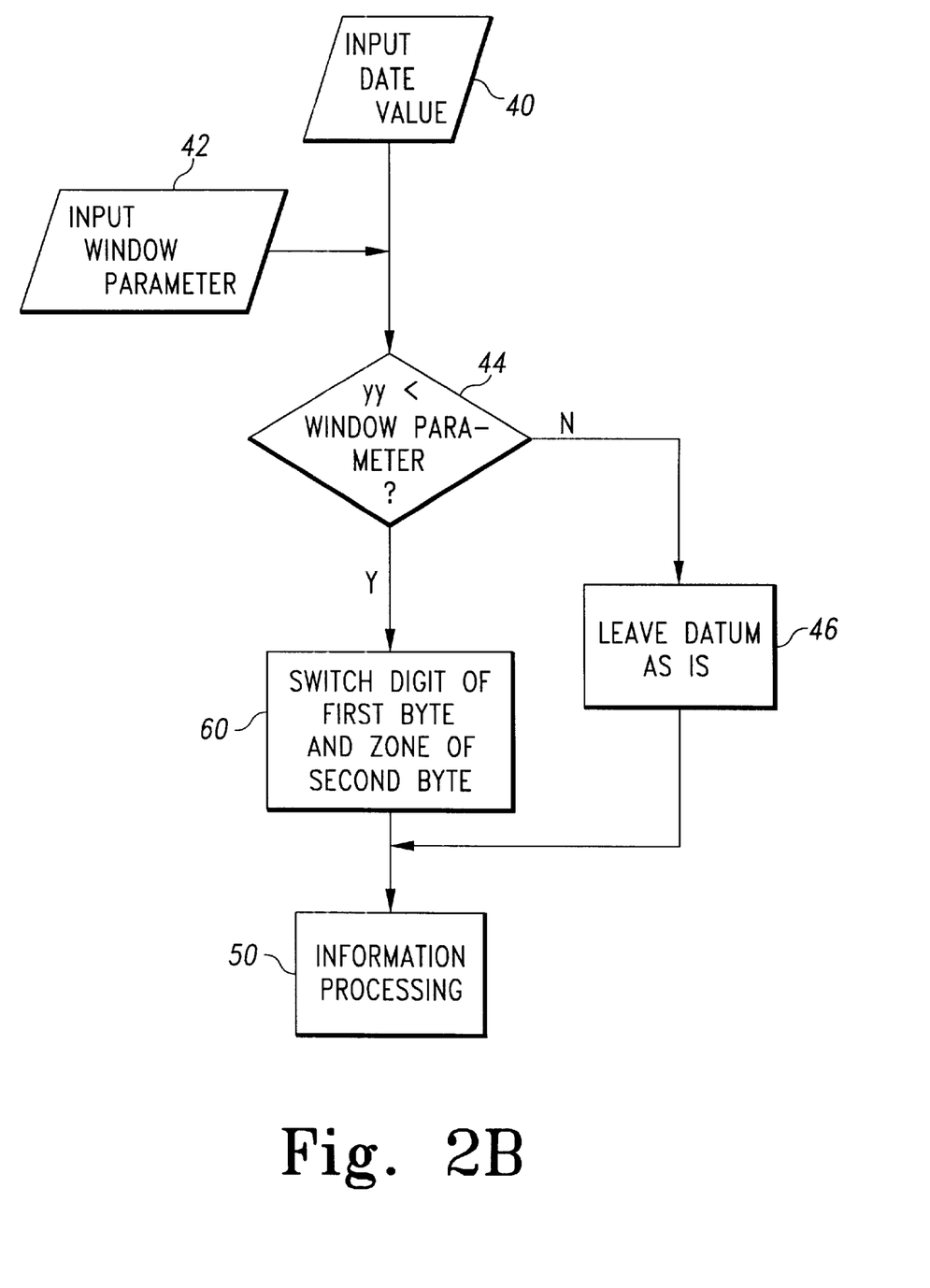
FIG. 2B is a flowchart illustrating one preferred embodiment of the encoding process for zoned decimal date values used in the method depicted in FIG. 1.

Now referring generally to FIGS. 2A and 2B, one preferred method of encoding date values (indicated at functional block 22 of FIG. 1) in accordance with another aspect of the present invention is illustrated. The first step, indicated at functional block 40, is to obtain a set of date-oriented information and to make available to the subroutine the date values of such information. The information and date values may be obtained from database or other storage and placed in a buffer to be accessed by the subroutine, the subroutine may be given one datum and date value at a time from such storage, or other methods of providing date values to the subroutine may be employed. In each case, the subroutine operates on each date value individually. In functional block 42, the subroutine obtains the window parameter for the dynamic window to be used in the encoding process. As noted above, the dynamic window identifies a one hundred-year period, the beginning and ending of which is user-defined or determined internally by the computer system. The window parameter is the two-digit representation of the year beginning the window. Thus, for example, for a window of 60–59 (representing, e.g., 1960–2059), the window parameter is 60.

The subroutine first compares the value of the two-digit year designator of the datum to the window parameter, as indicated in functional block 44. If the year designator value is greater than or equal to the window parameter, the datum is not encoded. For example, if the year designator value of a particular datum is 62 and the window parameter is 60 (representing e.g. 1960–2059), the datum has a year date of 1962. Dates in the lower century (e.g. in the 1900's) are not encoded in a preferred embodiment, as noted above. Non-encoded data are passed on, as indicated at functional block 46.

If, however, the year designator value is less than the window parameter, then the datum indicates a year in the later century (e.g. in the 2000's). Since in a preferred embodiment of the invention all dates in the later century are to be encoded, if the subroutine determines that the year designator value is less than the window parameter, the date value of the datum is thereafter encoded as depicted in functional block 48. Functional block 48 depicts the encoding method useful for date values in a packed decimal format. In the encoding step, the last or right-most digit (the sign value, usually a hexadecimal F) is moved to the first or left-most position in the date value. As an example, the date value of Feb. 28, 2001, in yyddd packed decimal format, is 01059F. The encoding process would operate on such a date value for any window parameter greater than 01. The encoding step moves the hexadecimal F from the last position to the first position, providing a coded date value for Feb. 28, 2001 in yyddd packed decimal format of F01059. The coded date value, and its associated information, may then be sequenced or otherwise operated on by an application program or other process, as depicted in functional block 50.

In a preferred embodiment, the encoding subroutine operates on the date value of every datum to be processed before sequencing or processing the entirety of the date-oriented information. The date value of each datum is compared to the window parameter and either encoded or passed on, the data are reassembled, and then sequencing or processing begins on the complete set of date-oriented information. However, it is understood that under certain conditions, it may be desirable to process each datum from reading step 40 through sequencing or processing step 50, individually, repeating the entire set of steps for every subsequent datum.

As noted, the above-described embodiment of the method of the present invention is particularly suited to packed decimal date values. Another embodiment of the present invention for zoned decimal date values is illustrated in the flowchart of FIG. 2B. The steps depicted in FIG. 2A and FIG. 2B are the same except for the encoding steps, depicted in functional block 48 in FIG. 2A and in functional block 60 in FIG. 2B. If it is determined that a zoned decimal date value is to be encoded, then the encoding step comprises switching the places of the digit of the first byte and the zone of the second byte. For example, the date Feb. 28, 2001 in yyddd zoned decimal format is represented as F0F1F0F5F9. To encode that datum, the digit of the first byte, in this case 0, is switched with the zone of the second byte, in this case F. The resulting coded date value is FF01F0F5F9.

A common operation performed on date-oriented information is the sequencing of such information in chronological order. "Ascending" order occurs when the dates are placed in order with the oldest dates first and the most recent dates last. The embodiments of the present invention outlined above allow sequencing of dates spanning the end of the century using known algorithms and methods. Without such encoding, the dates representing February 28 in the years 1998–2002 would be organized as follows:

| Packed Decimal | | Zoned Decimal | |
| --- | --- | --- | --- |
| yyddd | yymmdd | yyddd | yymmdd |
| 00059F | 0000228F | F0FGF0F5F9 | F0F0F0F2F2F8 |
| 01059F | 0010228F | F0F1F0F5F9 | F0F1F0F2F2F8 |
| 02059F | 0020228F | F0F2F0F5F9 | F0F2F0F2F2F8 |
| 98059F | 0980228F | F9F8F0F5F9 | F9F8F0F2F2F8 |
| 99059F | 0990228F | F9F9F0F5F9 | F9F9F0F2F2F8 |

Known sorting programs (such as the standard EBCDIC collating sequence) sort dates in ascending order, with the smallest year values (i.e. the smallest year designator values) first and the largest year values last. As seen in the above table, when sequencing two-digit year designator values for years spanning the end of a century using known sorting methods, date values representing dates in 1998 and 1999 are erroneously placed after date values representing dates in 2000 and beyond. With the above-described encoding process, known sequencing algorithms can be used. By encoding all date values representing dates in 2000 and later, the date values representing Feb. 28, 1998 through 2002 are placed in their proper order as follows:

| Packed Decimal | | Zoned Decimal | |
| --- | --- | --- | --- |
| yyddd | yymmdd | yyddd | yymmdd |
| 98059F | 0980228F | F9F8F0F5F9 | F9F8F0F2F2F8 |
| 99059F | 0990228F | F9F9F0F5F9 | F9F9F0F2F2F8 |

-continued

| Packed Decimal | | Zoned Decimal | |
|---|---|---|---|
| yyddd | yymmdd | yyddd | yymmdd |
| F00059 | F0000228 | FF00F0F5F9 | FF00F0F2F2F8 |
| F01059 | F0010228 | FF01F0F5F9 | FF01F0F2F2F8 |
| F02059 | F0020228 | FF02F0F5F9 | FF02F0F2F2F8 |

Figure 3A:
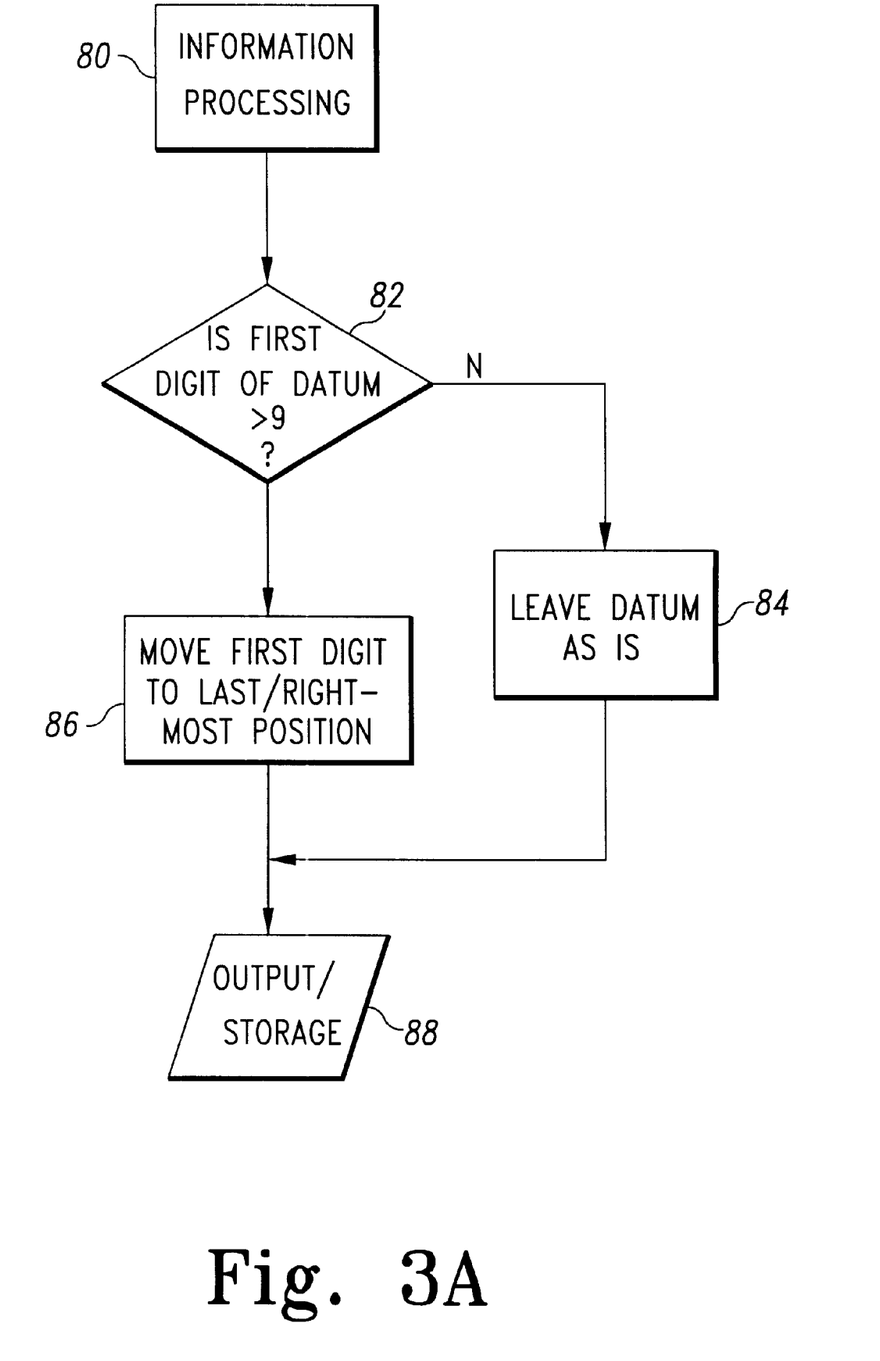
FIG. 3A is a flowchart illustrating one preferred embodiment of the decoding process for packed decimal date values used in the method depicted in FIG. 1.
Figure 3B:
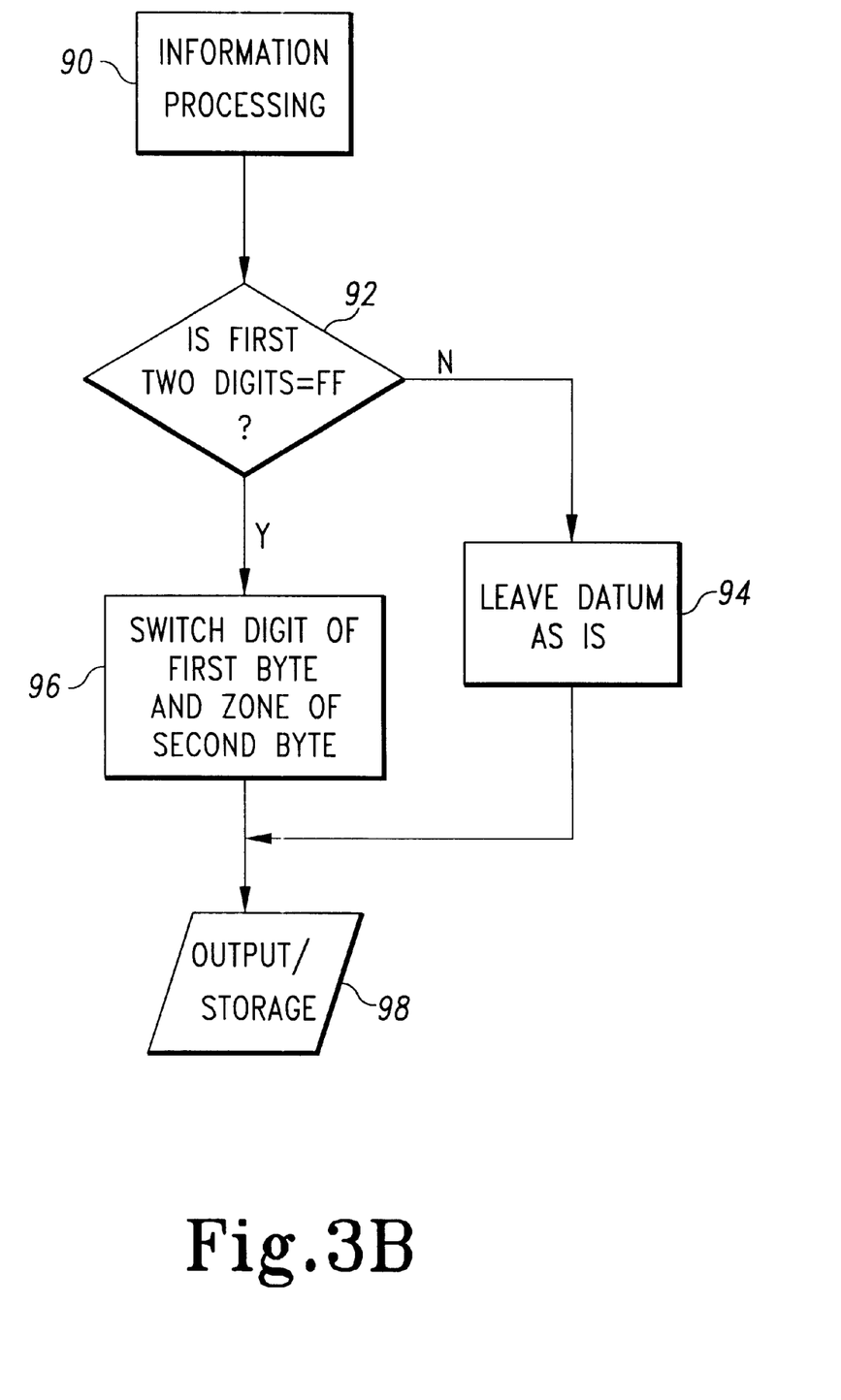
FIG. 3B is a flowchart illustrating one preferred embodiment of the decoding process for zoned decimal date values used in the method depicted in FIG. 1.

The decoding step, depicted in FIG. 1 at functional block 26, is further depicted in FIGS. 3A and 3B. The decoding of coded date values is very similar to the encoding process. Referring specifically to FIG. 3A, when the sequencing or processing of the date-oriented information (represented in functional block 80) is complete, the date values are decoded. As depicted in functional block 82, it is first determined whether a given date value has been encoded. The first digit of the date value is examined to determine whether it is greater than 9 in hexadecimal form. As shown in the examples given above, any packed decimal date value having a first digit greater than 9 is a coded date value. Thus, if the first digit of a datum is not greater than 9, then the date value is not decoded and is passed on, as depicted in functional block 84. If, however, the first digit of the date value is greater than 9, then it must be decoded. As depicted in functional block 86, the decoding step comprises moving the first or left-most digit to the last or right-most position. As with the encoding subroutine, the decoding subroutine may be called for each individual date value or for a set of date values, and operates individually on each date value. When the date values have been decoded, an output of the date-oriented information may be made to storage, an output device, or by other method known in the art, as depicted in functional block 88.

FIG. 3A depicts specifically the decoding of date values in packed decimal form. Referring now to FIG. 3B, the decoding method for date values in zoned decimal form is depicted. When the sequencing or processing of the date-oriented information (represented in functional block 90) is complete, the date values are decoded. As depicted in functional block 92, it is first determined whether a given date value has been encoded. The date value is examined to determine whether its first two digits are hexadecimal FF. As shown in the examples given above, any zoned decimal date value having FF as its first two digits is a coded date value. Thus, if the first two digits of a datum are not FF, then the date value is not decoded and is passed on, as depicted in functional block 94. If, however, the first two digits of the date value are FF, then the date value must be decoded. As depicted in functional block 96, the decoding step comprises switching the positions of the digit of the first byte and the zone character of the second byte of the date value. As with the encoding subroutine, the decoding subroutine may be called for each individual date value or for a set of date values, and operates individually on each date value. When the date values have been decoded, an output of the date-oriented information may be made to storage, an output device, or by other method known in the art, as depicted in functional block 98.

As noted, the encoding method described above provides for an ascending sequence of date-oriented information. To provide date-oriented information in descending or reverse sequence (i.e. with most recent dates first and oldest dates last), an alternative operation is necessary. The most common technique to obtain a reverse sequence is to subtract the date value from a complement number before sequencing. The usual complement number for two-digit year designators is "all nines;" for dates in yyddd style, therefore, the usual complement number is 99999. The resulting difference between the date value and the complement number, called the "key value," is then sequenced using a known algorithm for obtaining an ascending sequence. After converting the date values to key numbers, and sequencing the key numbers in ascending sequence, the key numbers are reconverted while maintaining the order of the data to a sequence of date values by subtracting the key numbers from the complement number.

Figure 4:
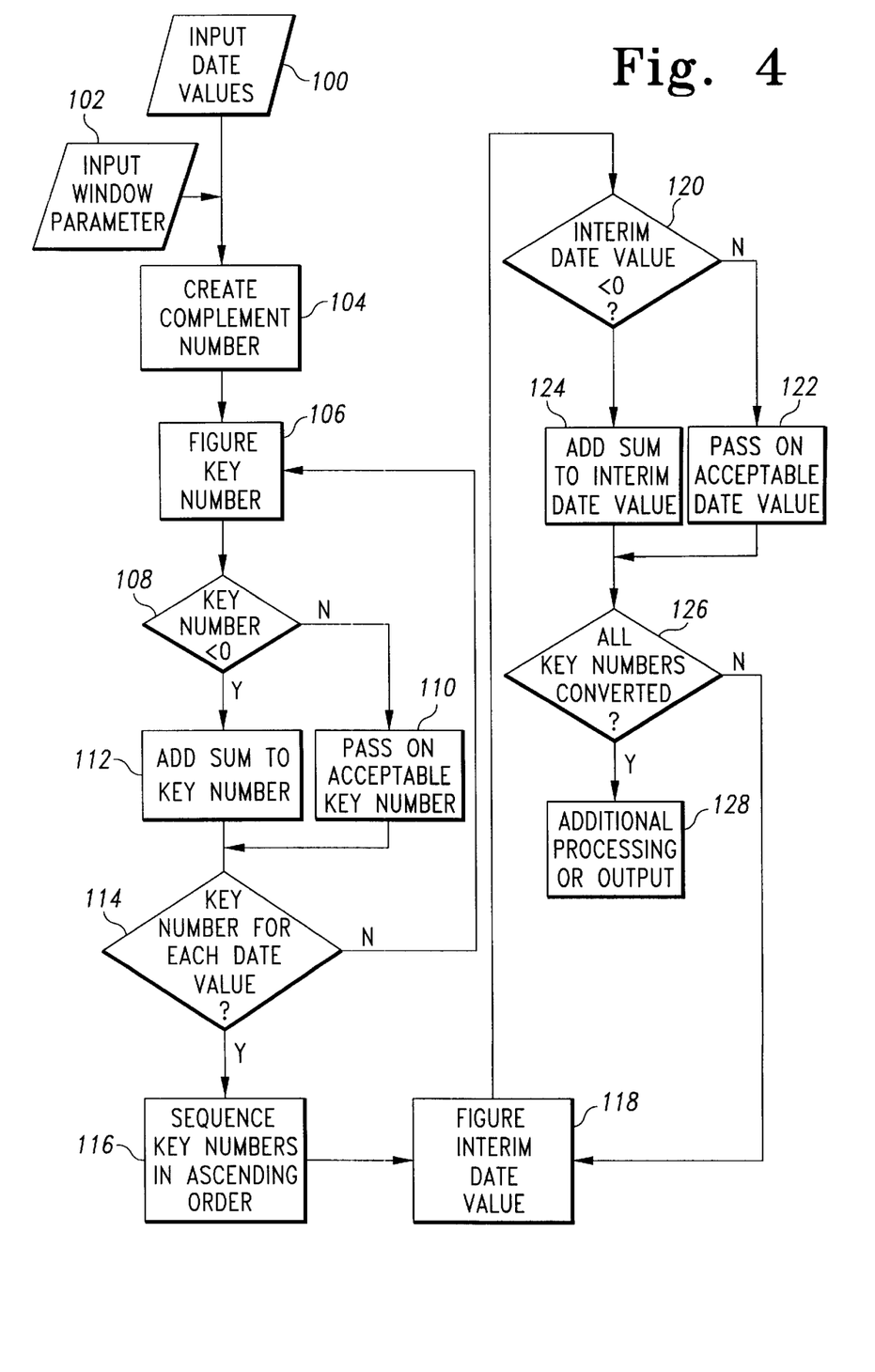
FIG. 4 is a flowchart illustrating one preferred embodiment of a method for providing date-oriented information in descending chronological order according to the present invention.

The present invention also provides a method of creating a descending sequence of date values spanning the end of a century using dynamic windowing. As noted above, a window parameter is selected by the user or calculated internally to provide a window of dates on which operations are to be performed. The selected window parameter is used to obtain an appropriate complement number for use in creating the descending sequence. Referring specifically to FIG. 4, a flowchart is illustrating a preferred method of sequencing dates in descending order according to the present invention is depicted. As shown in functional block 100, a set of date-oriented information is obtained and the date values of the information are made available to the subroutine. The window parameter is also obtained, as depicted in functional block 102. A complement number is then created, as depicted in functional block 104, by subtracting 1 from the window parameter and adding nines after the modified window parameter to obtain the necessary number of digits for the complement number. For example, a chosen window of dates between 1947 and 2046 inclusive has a window parameter of 47. The window parameter is modified by subtracting 1 to obtain 46. Since a complement number of five digits is necessary for date values in yyddd style, three nines are added to the end of the number, to provide a complement number of 46999.

The complement number is then used to convert the date values to key numbers. After each key number is generated, by subtracting the date value from the complement number (represented in functional block 106), the key value is checked to determine whether it is positive or negative, as depicted in functional block 108. If the key number is positive, it is satisfactory, and is passed on, as depicted in functional block 110. However, as functional block 112 shows, if the key number is negative, the number $10^x$ is added thereto, where x is one more than the number of digits in the complement number. Thus, in the example cited above, where the complement number is 46999, 100,000 would be added to any negative key number. As shown in functional block 114, a key number is generated for each date value.

When key numbers have been generated for all of the date values, the key numbers are sequenced in ascending order using a known algorithm, as depicted in functional block 116. While keeping the sequence, the key numbers are then converted to interim date values by subtracting each key number from the complement number, as depicted in functional block 118. Each interim date value is reviewed to determine whether it is less than zero, as shown in functional block 120. If the interim date value is positive, it is an acceptable date value and is passed on, as depicted in functional block 122. If the interim date value is negative, then the number $10^x$ is added thereto (represented by functional block 124), where x is one more than the number of digits in the complement number. Thus, in the example cited above, where the complement number is 46999, 100,000 would be added to any negative interim date value to convert it into an acceptable date value. As depicted in functional block 126, each key number is converted to an interim date value. The acceptable date values in descending chronological order may then be additionally processed or may be output, as depicted in functional block 128.

In the table below, key numbers ranging from 998–99998 are generated for the dates January 1 for the years 2046–1947, and then the key numbers are converted back to date according to the method of the present invention:

| Convert Date to Key | | | Convert Key to Date | | |
|---|---|---|---|---|---|
| yyddd | | IMS Key | | IMS Key | yyddd |
| 46999 | −46001 | 998 | 46999 | −998 | 46001 |
| 46999 | −45001 | 1998 | 46999 | −1998 | 45001 |
| 46999 | −44001 | 2998 | 46999 | −2998 | 44001 |
| 46999 | −43001 | 3998 | 46999 | −3998 | 43001 |
| . | | | | | |
| . | | | | | |
| . | | | | | |
| 46999 | −03001 | 43998 | 46999 | −43998 | 03001 |
| 46999 | −02001 | 44998 | 46999 | −44998 | 02001 |
| 46999 | −01001 | 45998 | 46999 | −45998 | 01001 |
| 46999 | −00001 | 46998 | 46999 | −46998 | 00001 |
| 46999 | −99001 + 100000 | 47998 | 46999 | −47998 + 100000 | 99001 |
| 46999 | −98001 + 100000 | 48998 | 46999 | −48998 + 100000 | 98001 |
| 46999 | −97001 + 100000 | 49998 | 46999 | −49998 + 100000 | 97001 |
| . | | | | | |
| . | | | | | |
| . | | | | | |
| 46999 | −48001 + 100000 | 98998 | 46999 | −98998 + 100000 | 48001 |
| 46999 | −47001 + 100000 | 99998 | 46999 | −99998 + 100000 | 47001 |

When processing information having date values spanning the end of a century, a parameter should be included designating whether the information is desired in ascending or descending chronological order. Upon receiving the desired direction of chronological order, the appropriate process can be instituted.

Figure 5:
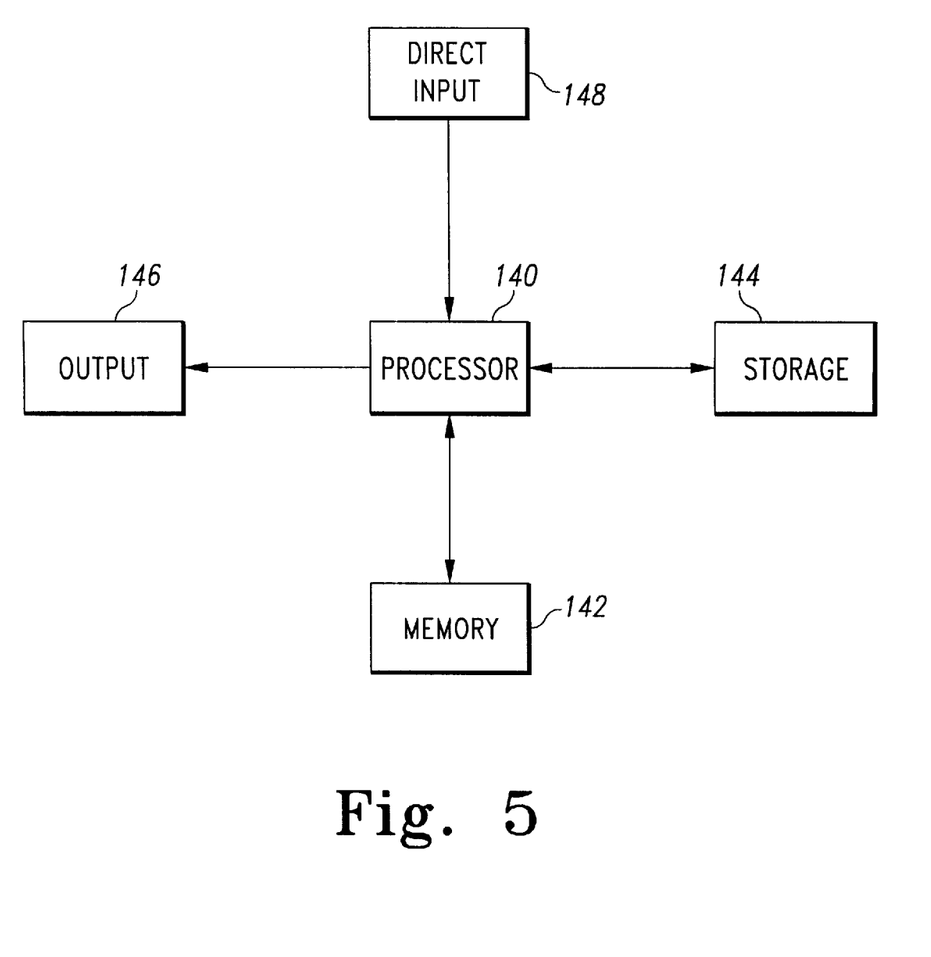
FIG. 5 is a diagrammatic illustration of a computer system operable to execute the algorithms of FIGS. 1–4.

Referring now to FIG. 5, there is generally depicted one embodiment of a computer system operable to execute the software routines to perform the steps of the present invention illustrated in FIGS. 1–4. Processor 120 is operatively connected to memory 142, data storage 144, output device 146, direct input device 148 and/or other components useful in a computer system. Processor 140 may be a personal computer (PC), a mainframe computer, or other data processing device. Memory 142 may be read-only memory or random access memory, and may be housed together with or separate from processor 140. Storage 144 may be any of a number of physical data storage devices such as floppy disks, magnetic tape or the like. Note that databases or other data collections with which the method of the present invention is useful may occupy either memory 142 or storage 144 or both. Output device 146 is a device for presenting information to the user of the computer system, such as video terminals, printers, and the like. Direct input device 148 may be a keyboard or other device for allowing a user to input information to processor 140 directly, as opposed to through data storage devices. The computer system operable to execute the software method disclosed herein may, of course, include multiples of one or more of the above-described devices.

Program changes necessary for using the method of the present invention are primarily at points of calls to a database or other store of information. Thus, application programs are easily configured to adopt the method of the present invention. A programmer, software, or other modifier need only attach to such database calls a call to the encoding and/or decoding subroutines which perform the method of the present invention.

As noted above, date values in any style can be encoded or decoded according to the method of the present invention. The method of the present invention is not dependent upon the number of digits in a date value or the time periods that they represent, so long as the first two digits of a date value denominate the last two digits of a year. The present invention is useful with any date values in packed decimal or zoned decimal format. Thus, whether the digits represent days, weeks or months, the encoding and decoding methods of the present invention will allow processing of any such date values representing dates spanning the end of the century.

The present invention is useful with the Information Management System (IMS) product of IBM Corporation. It is believed that the method and system of the present invention will be useful with any database or other data storage configuration using the packed decimal or zoned decimal formats for storing date values.

In the use of the present invention, it is also noted that date-oriented information having dates in the year 2000 and beyond may be initially entered into a database or other data storage configuration in its encoded form. For example, the date Jan. 1, 2001 as a part of a datum being entered into a database may be stored, from the outset, in yyddd packed decimal form as F01001. Such entries will not affect the working of the present invention The step of determining whether a datum is already encoded when it is received from the database or other data storage configuration allows encoded dates to be entered into the system from the start without affecting the method of the present invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of processing date-oriented information in a computer system, said date-oriented information comprising one or more date values each having a plurality of hexadecimal digits, said method comprising the steps of:

encoding at least a portion of said date-oriented information;

performing a desired operation on said date-oriented information;

decoding said portion of said date-oriented information;
    wherein said date values are packed decimal date values and said encoding step comprises moving the right-most digit of one of said date values to the left-most position in said one of said date values, and repeating said moving step for the remainder of said portion of said date-oriented information.

2. A method of processing date-oriented information in a computer system, said date-oriented information comprising one or more date values each having a plurality of hexadecimal digits, said method comprising the steps of:

encoding at least a portion of said date-oriented information;

performing a desired operation on said date-oriented information;

decoding said portion of said date-oriented information;
wherein said date values are zoned decimal date values, and said encoding step comprises moving the digit character of the first byte of one of said date values to the zone character position of the second byte of said one of said date values and moving the zone character of the second byte of said one of said date values to the digit character position of the first byte of said one of said date values, and repeating said moving steps for the remainder of said portion of said date-oriented information.

3. A method of processing date-oriented information in a computer system, said date-oriented information comprising one or more date values each having a plurality of hexadecimal digits, said method comprising the steps of:
encoding at least a portion of said date-oriented information;
performing a desired operation on said date-oriented information;
decoding said portion of said date-oriented information;
wherein said date values are packed decimal date values and said decoding step comprises moving the left-most digit of one of said date values to the right-most position in said one of said date values, and repeating said moving step for the remainder of said portion of said date-oriented information.

4. A method of processing date-oriented information in a computer system, said date-oriented information comprising one or more date values each having a plurality of hexadecimal digits, said method comprising the steps of:
encoding at least a portion of said date-oriented information;
performing a desired operation on said date-oriented information;
decoding said portion of said date-oriented information;
wherein said date values are zoned decimal date values, and said decoding step comprises moving the digit character of the first byte of said one of said date values to the zone character position of the second byte of said one of said date values and moving the zone character of the second byte of said one of said date values to the digit character position of the first byte of said one of said date values, and repeating said moving steps for the remainder of said portion of said date-oriented information.

5. A method for processing in a computer system a data set comprising a plurality of date values each having a plurality of hexadecimal digits, said date values representing dates in two consecutive centuries, said method comprising the steps of:
encoding at least a portion of said date values, said portion consisting of date values representing dates in the later of said two consecutive centuries;
performing a desired operation on said data set;
decoding said portion of said date values;
wherein said date values are packed decimal date values and said encoding step comprises moving the right-most digit of one of said date values to the left-most position in said one of said date values and repeating said moving step for the remainder of said portion of said date values.

6. A method for processing in a computer system a data set comprising a plurality of date values each having a plurality of hexadecimal digits, said date values representing dates in two consecutive centuries, said method comprising the steps of:
encoding at least a portion of said date values, said portion consisting of date values representing dates in the later of said two consecutive centuries;
performing a desired operation on said data set;
decoding said portion of said date values;
wherein said date values are zoned decimal date values, and said encoding step comprises moving the digit character of the first byte of one of said date values to the zone character position of the second byte of said one of said date values and moving the zone character of the second byte of said one of said date values to the digit character position of the first byte of said one of said date values, and repeating said moving steps for the remainder of said portion of said date values.

7. A method for processing in a computer system a data set comprising a plurality of date values each having a plurality of hexadecimal digits, said date values representing dates in two consecutive centuries, said method comprising the steps of:
encoding at least a portion of said date values, said portion consisting of date values representing dates in the later of said two consecutive centuries;
performing a desired operation on said data set;
decoding said portion of said date values;
wherein said date values are packed decimal date values and said decoding step comprises moving the left-most digit of one of said date values to the right-most position in said one of said date values, and repeating said moving step for the remainder of said portion of said date values.

8. A method for processing in a computer system a data set comprising a plurality of date values each having a plurality of hexadecimal digits, said date values representing dates in two consecutive centuries, said method comprising the steps of:
encoding at least a portion of said date values, said portion consisting of date values representing dates in the later of said two consecutive centuries;
performing a desired operation on said data set;
decoding said portion of said date values;
wherein said date values are zoned decimal date values, and said decoding step comprises moving the digit character of the first byte of said one of said date values to the zone character position of the second byte of said one of said date values and moving the zone character of the second byte of said one of said date values to the digit character position of the first byte of said one of said date values, and repeating said moving steps for the remainder of said portion of said date values.

9. A method of sequencing a set of date-oriented information having a plurality of dates spanning the end of a century in ascending chronological order via a computer system, said dates being represented by date values each having a year value of at least two digits, said method comprising the steps of:
selecting a window parameter identifying a window of said date-oriented information to be examined;
comparing said window parameter to said year value of one of said date values;
encoding said one of said date values if said year value is less than said window parameter and leaving said one of said date values in its non-encoded form if said year value is greater than or equal to said window parameter;

repeating said comparing and encoding steps for each of the remainder of said year values;

sequencing said date-oriented information by operating on said encoded and non-encoded date values with an algorithm for sequencing values in ascending order;

wherein said date values are packed decimal date values and said encoding step comprises moving the right-most digit of said one of said date values to the left-most position in said one of said date values.

10. A method of sequencing a set of date-oriented information having a plurality of dates spanning the end of a century in ascending chronological order via a computer system, said dates being represented by date values each having a year value of at least two digits, said method comprising the steps of:

selecting a window parameter identifying a window of said date-oriented information to be examined;

comparing said window parameter to said year value of one of said date values;

encoding said one of said date values if said year value is less than said window parameter and leaving said one of said date values in its non-encoded form if said year value is greater than or equal to said window parameter;

repeating said comparing and encoding steps for each of the remainder of said year values;

sequencing said date-oriented information by operating on said encoded and non-encoded date values with an algorithm for sequencing values in ascending order;

wherein said date values are zoned decimal date values and said encoding step comprises moving the digit character of the first byte of said one of said date values to the zone character position of the second byte of said one of said date values and moving the zone character of the second byte of said one of said date values to the digit character position of the first byte of said one of said date values.

11. A method of sequencing a set of date-oriented information having a plurality of dates spanning the end of a century in a By ascending chronological order via a computer system, said dates being represented by date values each having a year value of at least two digits, said method comprising the steps of:

selecting a window parameter identifying a window of said date-oriented information to be examined;

comparing said window parameter to said year value of one of said date values;

encoding said one of said date values if said year value is less than said window parameter and leaving said one of said date values in its non-encoded form if said year value is greater than or equal to said window parameter;

repeating said comparing and encoding steps for each of the remainder of said year values;

sequencing said date-oriented information by operating on said encoded and non-encoded date values with an algorithm for sequencing values in ascending order;

decoding said encoded date values;

wherein said date values are packed decimal date values and said decoding step comprises moving the left-most digit of one of said encoded date values to the right-most position in said one of said encoded date values and repeating said moving step for the remainder of said encoded date values.

12. A method of sequencing a set of date-oriented information having a plurality of dates spanning the end of a century in ascending chronological order via a computer system, said dates being represented by date values each having a year value of at least two digits, said method comprising the steps of:

selecting a window parameter identifying a window of said date-oriented information to be examined;

comparing said window parameter to said year value of one of said date values;

encoding said one of said date values if said year value is less than said window parameter and leaving said one of said date values in its non-encoded form if said year value is greater than or equal to said window parameter;

repeating said comparing and encoding steps for each of the remainder of said year values;

sequencing said date-oriented information by operating on said encoded and non-encoded date values with an algorithm for sequencing values in ascending order;

decoding said encoded date values;

wherein said date values are zoned decimal date values and said decoding step comprises moving the digit character of the first byte of one of said encoded date values to the zone character position of the second byte of said one of said encoded date values and moving the zone character of the second byte of said one of said encoded date values to the digit character position of the first byte of said one of said encoded date values, and repeating said moving steps for the remainder of said encoded date values.

\* \* \* \* \*